US008561495B2

(12) United States Patent
Trischberger

(10) Patent No.: US 8,561,495 B2
(45) Date of Patent: Oct. 22, 2013

(54) GEAR UNIT WITH A LAG FUNCTION

(75) Inventor: Werner Trischberger, Langenpettenbach (DE)

(73) Assignee: Huf Hulsbeck & Furst GmbH & Co., KG (DE)

( * ) Notice: Subject to any disclaimer, the term of this patent is extended or adjusted under 35 U.S.C. 154(b) by 487 days.

(21) Appl. No.: 12/700,058

(22) Filed: Feb. 4, 2010

(65) Prior Publication Data
US 2010/0199790 A1 Aug. 12, 2010

(30) Foreign Application Priority Data
Feb. 6, 2009 (DE) .......................... 10 2009 007 900

(51) Int. Cl.
*F16H 27/08* (2006.01)
(52) U.S. Cl.
USPC .............................. 74/437; 74/435
(58) Field of Classification Search
USPC .............. 74/74, 84, 84 R, 435, 437
See application file for complete search history.

(56) References Cited

U.S. PATENT DOCUMENTS

| 1,846,785 | A | * | 2/1932 | Breitling | 74/74 |
| 2,599,934 | A | * | 6/1952 | Opocensky | 338/149 |
| 2,881,630 | A | | 10/1956 | Opocensky | |
| 3,813,952 | A | * | 6/1974 | Fehrenbacher | 74/84 R |
| 4,090,410 | A | * | 5/1978 | Nakamura | 74/414 |
| 4,117,739 | A | * | 10/1978 | Meier et al. | 74/404 |
| 4,258,580 | A | * | 3/1981 | Lowe | 74/109 |
| 4,420,185 | A | | 12/1983 | Bienert et al. | |
| 4,722,239 | A | * | 2/1988 | Fleck et al. | 74/435 |
| 4,812,749 | A | * | 3/1989 | Sato et al. | 324/106 |
| 5,520,065 | A | * | 5/1996 | Hansen | 74/435 |
| 5,938,138 | A | * | 8/1999 | Sumiyashiki | 242/382.2 |
| 6,007,117 | A | | 12/1999 | Spindler | |
| 6,276,160 | B1 | * | 8/2001 | Terada et al. | 62/353 |

FOREIGN PATENT DOCUMENTS

| CN | 2514173 Y | 10/2002 |
| CN | 101182880 A | 5/2008 |
| DE | 2505663 B2 | 8/1976 |
| DE | 3823869 A1 | 1/1990 |
| DE | 4419178 A1 | 12/1995 |
| DE | 19718290 A1 | 11/1998 |
| DE | 10105032 A1 | 8/2002 |
| DE | 102004015068 A1 | 10/2005 |
| DE | 102007059712 A1 | 6/2009 |
| EP | 2196703 A2 | 6/2010 |
| JP | 63025855 A | 2/1988 |
| JP | 03086234 A | 4/1991 |
| JP | 04300445 A | 10/1992 |
| JP | 11283305 A | 10/1999 |
| JP | 2002340134 A | 11/2002 |
| WO | 2009074614 A1 | 6/2009 |

\* cited by examiner

*Primary Examiner* — Troy Chambers
*Assistant Examiner* — Valentin Craciun
(74) *Attorney, Agent, or Firm* — Cantor Colburn LLP

(57) ABSTRACT

A gear unit having a drive element with a first tooth structure, an output element with a second tooth structure, wherein the tooth structures are able to be brought into engagement cogging with each other to form a gearing in at least one engagement area of the second tooth structure. The output element has at least one uncoupling area, in which the cogging engagement of the gearing is uncoupled. The first tooth structure has at least one first modified tooth element and the second tooth structure has at least one second modified tooth element wherein by a movement of the drive element, synchronization of the second modified tooth element with the first modified tooth element is possible in order to create a change from the uncoupled state to the engagement state.

8 Claims, 2 Drawing Sheets

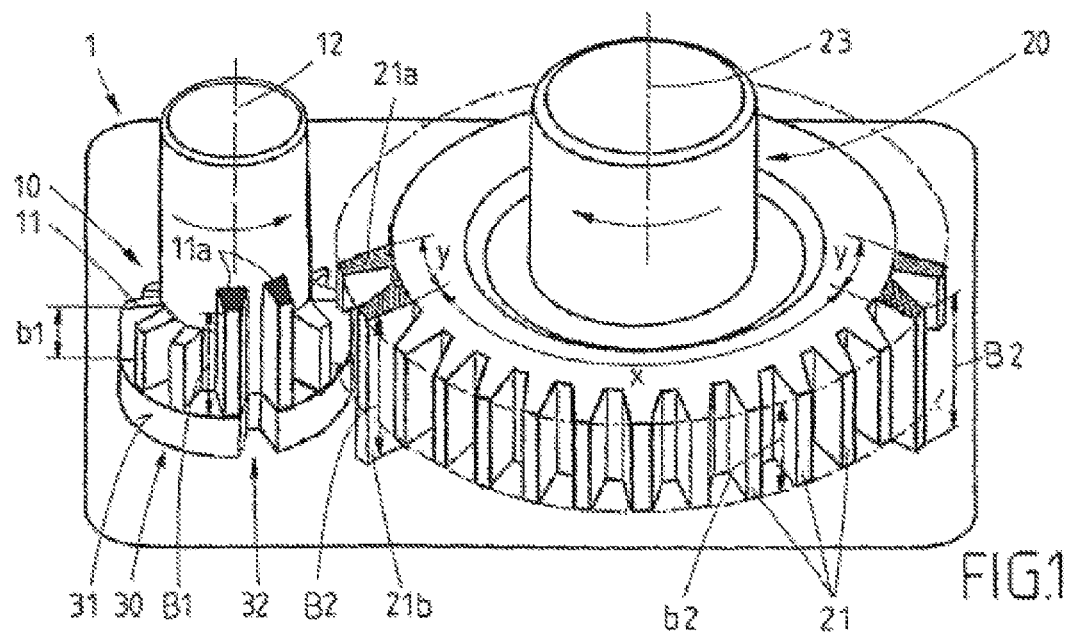
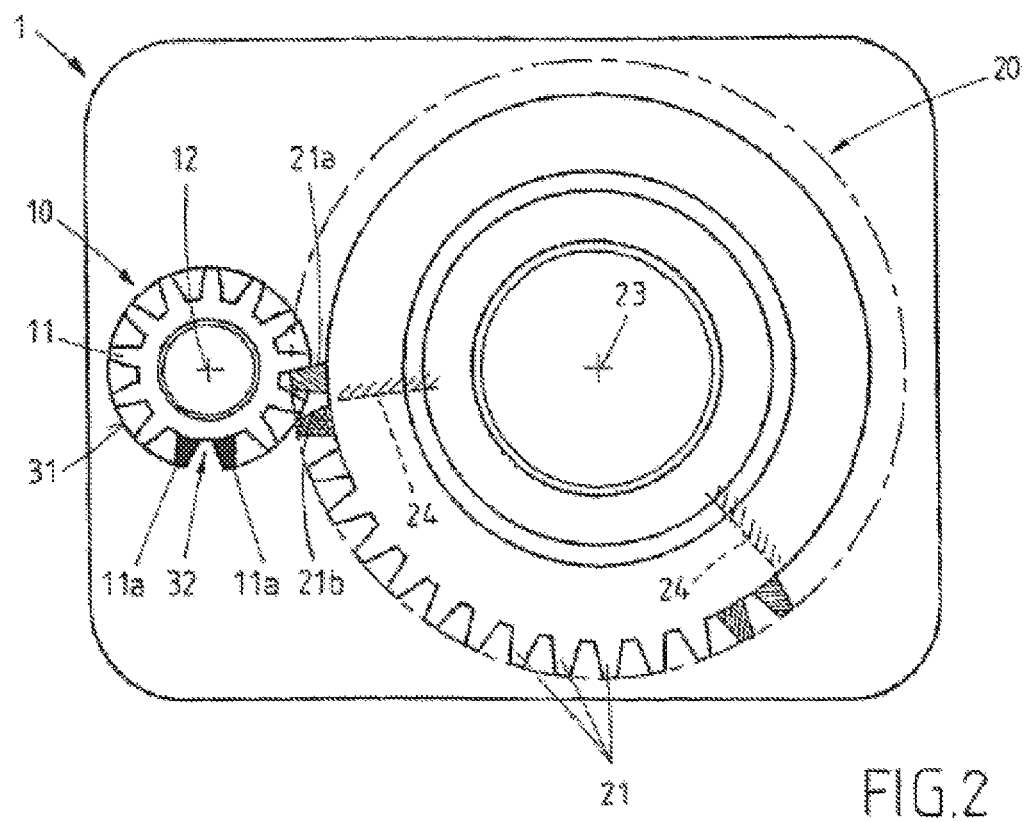

GEAR UNIT WITH A LAG FUNCTION

TECHNICAL FIELD

A gear unit is provided with a drive element with a first tooth structure and an output element with a second tooth structure, wherein the tooth structures of the respective elements are able to be brought in engagement cogging with each other to form a gearing in at least one engagement area of the second tooth structure, and wherein the output element has at least one uncoupling area, in which the cogging engagement of the gearing is uncoupled.

BACKGROUND

A generic gear unit with a disc-shaped drive element and an output element in the form of a tooth segment is known from DE 10 2007 059 712.8. The output element is made to be turnable about an axis of rotation. The tooth segment is in an effective connection with a barrier member of a steering-wheel lock of a motor vehicle. The drive element is thus driven by a screw gear. Further, the gear unit can be transferred to a neutral state in which the tooth segment is uncoupled from the disc-shaped drive element. In this neutral state a spring element exerts a defined force on the tooth segment by which the tooth segment is pressed back in the direction of the drive element.

With a continuing turning motion of the drive element an undesirable sound can result in which the tooth structure of the tooth segment periodically bumps into the tooth structure of the drive element. There is a further drawback that, in a change from the uncoupled state to the engagement state, there is no guarantee that the respective tooth structures will catch into each other in the proper position. The consequence of this is that the respective tooth tips of the tooth structures of the drive element and the output element can reach each other so that the gear unit jams. This can result in damage to the gear unit, thereby interrupting the movement of the drive element on the output element.

BRIEF SUMMARY

A gear unit is provided that overcomes the above-mentioned drawbacks and provides an improved arrangement of the gearing in the uncoupled state.

The invention includes the technical teaching that the first tooth structure has at least one first modified tooth element and the second tooth structure has at least one second modified tooth element, wherein by a movement of the drive element synchronization of the second modified tooth element with the first modified tooth element is possible in order to create a change from the uncoupled state to the engagement state.

The invention proceeds from the concept of creating a lag function for a gear unit that avoids the creation of noise and guarantees a properly positioned engagement of the respective tooth structures with a renewed start of the gear unit.

For example, if the drive element is driven by means of an electric motor; in which the gear unit is a component of a drive system, when the electric motor is switched off, a lag of the motor can result because of the inertia of the—especially rotary—moved masses. However, when the electric motor is switched off by the output element, a desired position—for example, rotary—position can be attained that will not be abandoned by the lag of the electric motor and consequently of the drive system. If the output element reaches the target position and the drive element lags, lag can take place over the uncoupling area of the output element.

According to the invention, both the tooth structure of the drive element and the tooth structure of the output element respectively possess at least one modified tooth element, so that a noise-free lag of the drive element is possible, along with a properly positioned engagement of the first tooth structure with the second tooth structure when the drive element is restarted in an opposite direction of movement. This is made possible by synchronization of the second modified tooth element with the first modified tooth element, which takes place when the drive element is put into operation again. Consequently, a change from the uncoupled state to the engagement state takes place without the drive element and the output element having to be spring-loaded.

Due to the missing spring bias, for example, of the output element, in the direction of the tooth engagement in the first tooth structure of the drive element, noise creation is also absent during the lag of the drive element. On the other hand, the modified tooth elements ensure that with a change from the uncoupled state to the engagement state the gearing of the respective tooth structures will be properly positioned. Thus the essence of the invention is that, without the spring bias of the elements composing the gear unit, a change from the uncoupled state to the engagement state is created by a respective modification of at least one tooth element on the drive element as well as at least one tooth element on the output element.

It is particularly advantageous if a blocking element is provided, by which the output element is blocked in the uncoupled state, so that the gear unit is implemented to be self-checking. The self-checking configuration of the gear unit is achieved by the blocking element for blocking the output element having a blocking surface, wherein the blocking element is arranged adjacent to the first tooth structure on the drive element. This results in a blocking of the output element in a first direction of movement, wherein the output element further has a stopper that obstructs further movement of the output element beyond the stopper. The output element is thus blocked by the stopper in the opposite direction as well. The stopper blocks in the direction of rotation that is opposite the direction of rotation that is blocked by the blocking surface of the blocking element. Consequently, the output element is blocked in both directions of movement in the uncoupled position, on one side by means of the stopper and on the other side by means of the blocking element.

The second tooth structure has at least one lengthened tooth element with an enlarged length wherein the length is greater than the smaller length of the rest of the remaining second tooth structure. To ensure a properly positioned gearing of the tooth structures when changing from the uncoupled state to the engagement state, the blocking element has an opening that is arranged in the blocking element at a place between the first modified tooth elements of the first tooth structure, so that upon synchronization of the second modified tooth element with a first modified tooth element the widened tooth element with the section of the enlarged length can fall into the opening.

The tooth elements with the smaller length of the second tooth structure can come into engagement with the first tooth structure since the spatial extension of the blocking element does not collide with the tooth elements of shorter length of the second tooth structure. However, since the second tooth structure has at least one tooth element of greater length, this first bumps into the blocking surface of the blocking element in order to create the self-checking of the gear unit. However, if the synchronization according to the invention of the second modified tooth element with the first modified tooth element takes place, the section of the widened tooth element falls into the opening in the blocking element that forms the enlarged length of the tooth element of the second tooth structure. This results in an interplay between the position of the synchronization of the second modified tooth element with the first modified tooth element at exactly that position in which the widened tooth element can fall into the opening in the blocking element.

In order to create a properly positioned synchronization of the second modified tooth element with the first modified tooth element, the first modified tooth element of the first tooth structure has an enlarged length that is greater than the shorter length of the remainder of the first tooth structure. The enlarged length of the modified first tooth element extends in the direction that is set against the arrangement of the blocking element adjacent to the first tooth structure. Since the second modified tooth element is shortened such that only the first modified tooth elements with the section of the enlarged length can come into engagement with the second modified tooth element, the tooth elements of the first tooth structure, which have the normal length, can be moved in the vicinity of the second modified tooth element of the output element, without coming into engagement with it.

The drive element as well as the output element can be implemented as gear wheels or pinions wherein the drive element and the output element are put into the gear unit with axes of rotation that are arranged parallel to each other at a distance.

According to a further embodiment the output element can be implemented as a linear extending gear rack with a tooth structure in which the tooth structure of the drive element implemented as a pinion or gear wheel cogs.

According to an advantageous embodiment the blocking element is formed as a disc with a defined height that has a diameter that corresponds at least to the outer diameter of the first tooth structure. The formation of the blocking element as a disc with a defined height results in a casing surface that forms the blocking surface, against which the section of the enlarged length of the lengthened tooth element of the second tooth structure can come to rest. This casing surface is interrupted by the opening in the disc into which the lengthened tooth element of the second tooth structure can fall.

The present invention further comprises a gear unit of the above-mentioned type that is implemented for the movement of a barrier element of a steering-wheel lock, a glove compartment lid of a motor vehicle, a window pane of a motor vehicle and/or a camera on a motor vehicle, or which serves for the activation of a lock on a lid on a motor vehicle, for example. The lid can represent a door of a motor vehicle or serve as the lid of the trunk of a motor vehicle.

BRIEF DESCRIPTION OF THE DRAWINGS

Further measures to improve the invention will be presented in more detail in what follows, together with the specification of a preferred embodiment of the invention with the drawings. These are:

FIG. 1 an embodiment of the gear unit of the invention in a perspective view in lag position, FIG. 2 a top view of the embodiment of the gear unit in lag position according to FIG. 1, FIG. 3 a perspective view of the embodiment of the gear unit in a position that represents the change from the uncoupled state to the engagement state and FIG. 4 a top view of the gear unit according to FIG. 3.

FIGS. 1 and 2 show an embodiment of a gear unit 1 according to the present invention. The gear unit 1 is shown in a perspective view in FIG. 1 and in a top view in FIG. 2.

DETAILED DESCRIPTION

Figure 3:
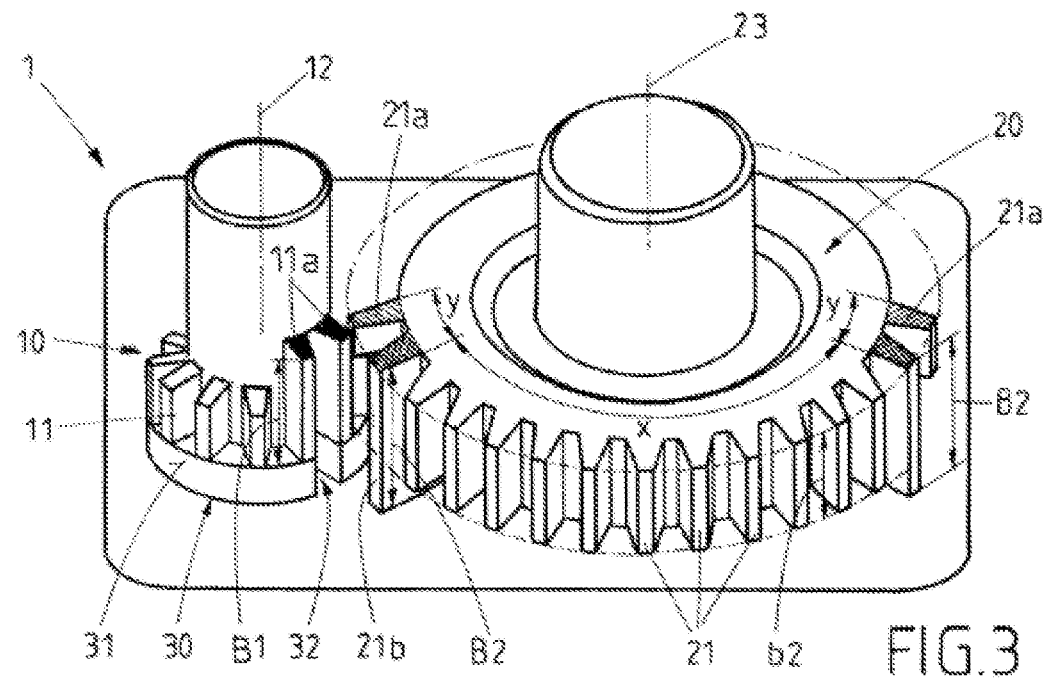

The gear unit 1 has a drive element 10 and an output element 20, wherein the drive element 10 has a first tooth structure 11 and the output element 20 has a second tooth structure 21. The tooth structures 11 and 21 are shown in an uncoupled state. The tooth structure 21 is divided into an engagement area marked with an X and two uncoupled areas marked with a Y. The drive element 10 is set up to be turnable about an axis of rotation 12 and the output element 20 about an axis of rotation 23, wherein the axes of rotation 12 and 23 are arranged parallel to each other at a distance, wherein a bend towards each other arrangement of the axes 12 and 23 is also possible, as for example with the gear of a mitre wheel. According to this embodiment the elements 10 and 20 are formed as gear wheels or pinions according to a spur wheel gearing, wherein according to a further embodiment the output element 20, at least, can also be implemented as a gear rack or a gear segment lever.

A respective rotation arrow is indicated on the drive element 10 and the output element 20 indicating the direction of rotation of the elements 10 and 20 in order to enable a change from the uncoupled state represented to the engagement state. Thereby the drive element 10 drives the output element 20, so that the change from the uncoupled state to the engagement state is possible only by a rotational motion of the drive element 10 in the direction indicated by the arrow.

In the uncoupled state represented, the output element 20 is fixed in one position in which the uncoupled area Y of the second tooth structure 21 points in the direction toward the tooth structure 11 of the drive element 10. The second tooth structure 21 of the output element 20 has two uncoupled areas Y, wherein the uncoupled areas Y lock the engagement area X of the second tooth structure 21 on the respective ends. The tooth structure 21 of the output element 20 is not fully extensive so that the tooth structure 21 merely forms a tooth segment and the first as well as the second uncoupled areas Y represented present two possible rotational positions of the output element 20 from which the gear unit 1 can be transferred from the uncoupled state to the engagement state.

The first tooth structure 11 of the drive element 10 has two modified tooth elements 11a, wherein the second tooth structure 21 then has a second modified tooth element 21a. If the drive element 10 is turned counter-clockwise in the direction of the arrow shown, then the right modified tooth element 11a comes into engagement with the second modified tooth element 21a. The other tooth elements of the first tooth structure 11 have a smaller length b1, whereas the first modified tooth elements 11a have an enlarged length B1. If the drive element 10 is placed in rotation in the direction of the arrow indicated, then the tooth elements of the first tooth structure 11 with length b1 run under the second modified tooth structure 21a. Only when one of the first modified tooth elements 11a comes to a place against the second modified tooth element 21a is the output element 20 also placed in rotation. The beginning of the rotation of the output element 20 takes place through synchronization of the second modified tooth element 21a with the first modified tooth element 11a. The rotational position of the output element 20 produced by this is then determined relative to the rotational position of the drive element 10.

A blocking element 30 designed as a disk 30 is arranged laterally on the first tooth structure 11 and has an opening 32.

Further, the second tooth structure 21 has a lengthened tooth element 21b wherein the lengthened area extends in the direction of the disc 30 and wherein the tooth element 21b has the same radial height as the other tooth structure 21, so that the outside diameter of all the tooth elements 21, 21a and 21b is the same. When the output element 20 is also placed in rotation by synchronization of the second modified tooth element 21a with the first modified tooth element 11a, the lengthened area of the lengthened tooth element 21b can reach into the opening 32. Thus, a change from the uncoupled state to the engagement state is created so that gearing can continue to run according to a normal, familiar gearing, as the lengthened as well as the shortened tooth elements do not have an effect on each other.

The result of the disc 30 arranged adjacent to the first tooth structure 11 is that the output element 20 blocks in the uncoupled state represented. The blocked state is caused when the section of the enlarged length B2 bumps against the blocking surface 31 of the disc 30, wherein the blocking surface 31 is formed by the casing surface of the disc 30. The stop position of the second modified tooth element 21b against the casing surface 31 of the disc 30 is clearly recognizable in the top view of FIG. 2. In order to block the output element 20 in both directions of rotation, this has stoppers 24. The stop position of the second modified tooth element 21b on the blocking surface 31 prevents further rotation of the output element 20 clockwise. In order to also create a counter-clockwise blocking of the output element 20 a stopper 24 is indicated, against which the output element 20 comes to rest. As a result, the output element 20 is blocked in both directions of rotation. The additional stopper 24 shown serves to block the direction of rotation of the output element 20 clockwise when the gearing assumes an uncoupled state across the uncoupled area Y shown on the right side.

Figure 4:
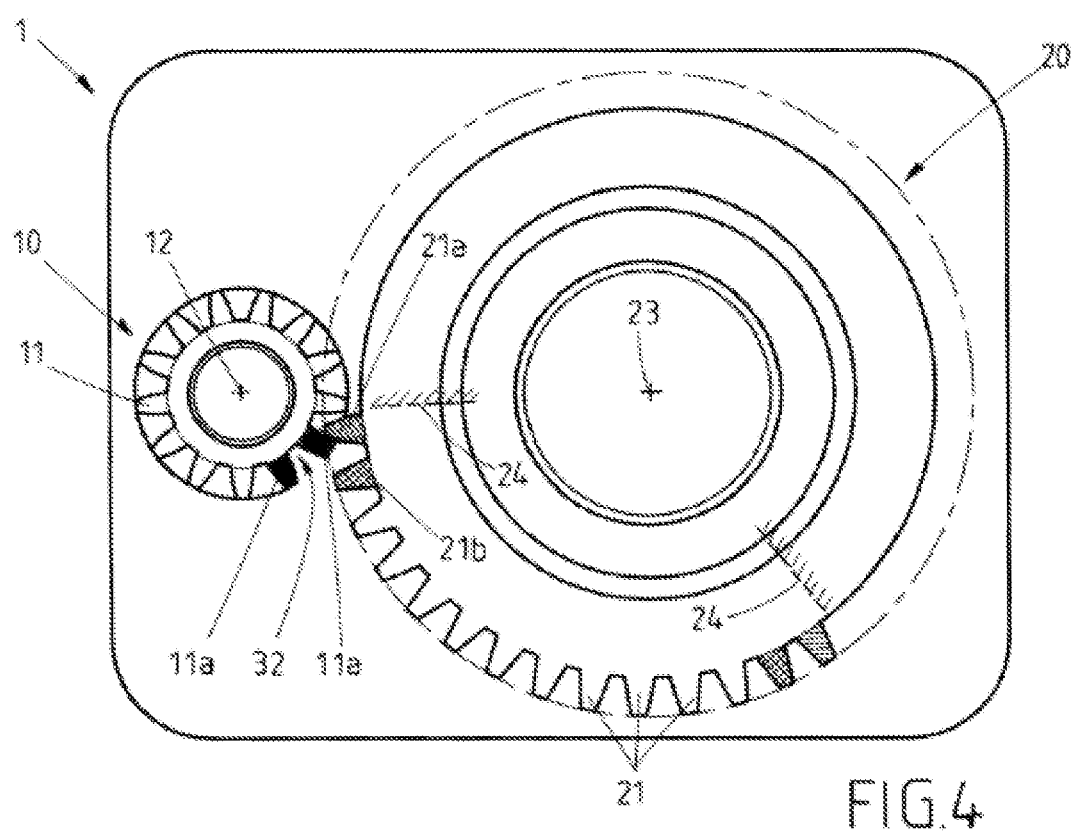

FIGS. 3 and 4 show the gear unit 1 for clarification of the synchronization of the second modified tooth element 21a with the first modified tooth element 11a in an advanced position in relation to the position of the gear unit 1 in FIGS. 1 and 2. Here the drive element 10 is slightly rotated counter-clockwise around the axis of rotation 12, wherein the output element 20 is rotated clockwise around the axis of rotation 23. The first modified tooth element 11a represented on the right side catches in the gap between the second modified tooth element 21a and the lengthened tooth element 21b of the second tooth structure 21. At this point, the lengthened tooth 21b can mesh in the opening 32 in the blocking element 30 so that with further turning of the drive element 10 counter-clockwise normal gearing of the tooth structures 11 and 21 can be continued. The respective turning of the drive element 20 takes place between the stoppers 24 so that the output element 20 is arranged to turn about the axis of rotation 23 only on one pitch circle. The first modified tooth element 11a of the first tooth structure 11 represented on the left side serves for synchronization of the second modified tooth element 21a on the right side of the output element 20 in that the left flank of the first modified tooth element 11a synchronizes the second modified tooth element 21a on the right side of the output element 20 with the counter-clockwise rotation of the drive element 10. As a result there is a mirror arrangement of the modified tooth elements 11a, 21a and 21b, wherein respectively a first modified tooth element 11a is present on the left as well as right sides in order to enable a change from the uncoupled state to the engagement state from both directions.

The invention is not limited in its implementation to the above-mentioned preferred embodiment. Rather, a number of variants are conceivable that make use of the presented solution even with basically other types of embodiments. All the features and/or advantages arising from the claims, the specification or the drawings, including structural details, spatial arrangements and method steps, can be essential to the invention by themselves as well as in different combinations. In particular, the drive element 10 and/or the output element 20 need not be necessarily implemented as a gearwheel or pinion, so that the output element 20 can also be implemented in the form of a gear rack with linear extension.

The invention claimed is:

1. A gear unit having:
   a drive element with a first tooth structure,
   an output element with a second tooth structure,
   wherein the tooth structures are able to be brought in engagement cogging with each other to form a gearing in at least one engagement area of the second tooth structure,
   wherein the output element has at least one uncoupling area,
   in which the cogging engagement of the gearing is uncoupled,
   wherein the first tooth structure has at least one first modified tooth element and
   wherein the second tooth structure has at least one second modified tooth element,
   wherein by a movement of the drive element, synchronization of the second modified tooth element with the first modified tooth element is enabled in order to create a change from the uncoupled state to the engagement state,
   wherein the second tooth structure has at least one lengthened tooth element with an enlarged length, which is greater than a smaller length of the rest of the second tooth structure,
   wherein the first modified tooth element of the first tooth structure has an enlarged length, that is greater than a smaller length of the majority of the first tooth structure, and
   a blocking element whereby the output element is blocked in the uncoupled state and the gear unit is configured to be self-locking,
   wherein the blocking element further includes a blocking surface and the blocking element is disposed adjacent the first tooth structure and arranged on the drive element.

2. The gear unit according to claim 1,
   wherein the blocking element has an opening that is arranged in the blocking element at a place between the first modified tooth elements of the first tooth structure, so that upon synchronization of the second modified tooth element with a first modified tooth element the lengthened tooth element with the section of the enlarged length can engage the opening.

3. The gear unit according to claim 1,
   wherein the second modified tooth element is shortened such that only the first modified tooth elements with the section of the enlarged length can come into engagement with the second modified tooth element.

4. The gear unit according to claim 1,
   wherein the blocking surface obstructs movement of the output element, in that it serves as a stopper for a section of the enlarged length of the lengthened tooth element.

5. The gear unit according to claim 1,
   wherein the drive element is implemented as a gear wheel and the output element as a gear wheel segment, which lie turnable about axes of rotation arranged parallel to each other at a distance.

6. The gear unit according to claim 1, wherein
the blocking element is implemented as a disc that has a diameter that corresponds at least to an outer diameter of the first tooth structure.

7. The gear unit according to claim 1, wherein
the output element has a stopper that obstructs further movement of the output element beyond the stopper, wherein the output element is blockable by the stopper in a stopping position when the gear unit is in the uncoupled state.

8. The gear unit according to claim 1, wherein the unit is configured for the movement of a barrier element of a steering-wheel lock,
a glove compartment lid of a motor vehicle,
a window pane of a motor vehicle and/or
a camera arranged on a motor vehicle and/or
for the activation of a lock of a lid of a motor vehicle.

\* \* \* \* \*